United States Patent [19]
Gerhardus et al.

[11] Patent Number: 5,273,212
[45] Date of Patent: Dec. 28, 1993

[54] BURNER WITH A COOLING CHAMBER HAVING CERAMIC PLATELETS ATTACHED TO A DOWNSTREAM FACE

[75] Inventors: Ulrich Gerhardus; Bernard Schleper, both of Oberhausen, Fed. Rep. of Germany

[73] Assignee: Hoechst Aktiengesellschaft, Fed. Rep. of Germany

[21] Appl. No.: 983,715

[22] Filed: Dec. 1, 1992

[30] Foreign Application Priority Data

Dec. 5, 1991 [DE] Fed. Rep. of Germany ....... 4140063

[51] Int. Cl.$^5$ .......................... C10J 3/50; B05B 15/00
[52] U.S. Cl. .................. 239/132.3; 239/288.3; 239/288.5; 239/DIG. 19; 239/424
[58] Field of Search ................ 239/132, 132.1, 132.3, 239/288, 288.3, 288.5, 423, 424, DIG. 19

[56] References Cited

U.S. PATENT DOCUMENTS

| | | |
|---|---|---|
| 4,364,744 | 12/1982 | Crouch et al. |
| 4,752,303 | 6/1988 | Materne et al. ............ 239/132.3 X |
| 4,887,962 | 12/1989 | Hasenack et al. ........... 239/132.3 X |
| 4,952,218 | 8/1990 | Lipp et al. ................ 239/132.3 X |

FOREIGN PATENT DOCUMENTS

| | | |
|---|---|---|
| 312133 | 4/1989 | European Pat. Off. |
| 3628865 | 5/1987 | Fed. Rep. of Germany. |
| 58-86316 | 5/1983 | Japan .................. 239/DIG. 19 |
| 3-31571 | 2/1991 | Japan .................. 239/DIG. 19 |

OTHER PUBLICATIONS

Patent Abstracts of Japan, vol. 15, No. 481 (M-1187); Dec. 6, 1991. JPA-3-207,905; Sep. 11, 1991.
ARS Journal, vol. 29, "New Aspects in Ceramic Coatings", pp. 19-21, Jan. 1959.

*Primary Examiner*—Andres Kashnikow
*Assistant Examiner*—William Grant
*Attorney, Agent, or Firm*—Jordan B. Bierman

[57] ABSTRACT

A burner for the production of synthesis gas by partial oxidation of carbon-containing fuels, which burner contains three or more concentrically arranged tubes and a cooling chamber. The downstream face of the cooling chamber is clad with a layer composed of individual, adjacently arranged, ceramic platelets.

20 Claims, 2 Drawing Sheets

BURNER WITH A COOLING CHAMBER HAVING CERAMIC PLATELETS ATTACHED TO A DOWNSTREAM FACE

This Application claims the benefit of priority of German Application P 41 40 063.1, filed Dec. 5, 1991.

The present invention relates to a burner having improved properties for the production of synthesis gas by partial oxidation of carbon-containing fuels.

BACKGROUND OF THE INVENTION

The production of synthesis gas is conventionally carried out by partial oxidation of carbon-containing materials with oxygen or an oxygen-containing gas; in particular, air at elevated pressure and relatively high temperatures of 1000° to 1600° C. The carbon-containing materials used are hydrocarbons, slurries of solid carbon-containing fuels in hydrocarbons, or slurries of solid carbon-containing fuels in water, such as coal/water suspensions.

EP 95 103 B1 describes a process and a burner for the production of synthesis gas. The process is carried out with the aid of a burner system composed of three concentric tubes, each of which has a conically tapering end, and a cooling chamber in the region of the burner outlet. Thus, three mass streams are fed to the reaction. The mass stream containing the oxygen or the oxygen-containing gas is conducted through the inner and the outer zone of the burner, and the carbon-containing material—a coal/water suspension—is passed through the annular space formed by the inner and middle tubes. 1 to 20% of the total oxygen required for the partial oxidation is allotted to the inner mass flow, the remaining oxygen requirement is supplied by the outer mass flow through the annular space formed by the middle and outer tubes.

The coal/water suspension forming the middle mass stream is fed to the reactor at a pressure of 1 to 20 MPa and a velocity of 1 to 25, in particular 2 to 15, m/second; while the inner and outer gas streams are passed into the reaction zone with a velocity of 50 to 300, in particular 80 to 200, m/second.

As a result of the conical tapers of the concentrically arranged tubes, the three mass streams meet each other at an acute angle. Hence, the coal/water suspension stream, after leaving the end of the conical taper, is forced or torn apart by the inner gas stream. The suspension stream is thus horizontally deflected and does not pass into the reaction zone in free fall. As a consequence, both the mean residence time of the individual coal/water droplets and the degree of conversion are increased.

At the same time, the outer gas stream impacts the coal/water suspension broadened by the inner gas stream and produces a further mixing of gas and suspension, so that a zone of uniform distribution of gas or oxygen and very fine suspension droplets is produced. This is an essential precondition for reacting the coal/water suspension to the greatest possible extent. It has been shown that, to use hydrocarbon-containing fuels for this purpose, conditions similar to those described above in more detail in connection with coal/water suspensions, are advantageous.

The partial oxidation of the carbon-containing fuel, in particular a hydrocarbon, leads to a highly chemically reactive mixture which contains about 30% to 50% by weight of carbon monoxide, about 30% to 50% by weight of hydrogen, about 3% to 20% by weight of $CO_2$ and unreacted steam and, in smaller quantities, also contains sulfur, iron, vanadium, nickel, sodium, chlorine, and calcium.

The material composition and the ash contents of the resulting gasification product are dependent, on the one hand, on the type of fuel and, on the other hand, on the process conditions; e.g. the amount of oxygen, the temperature established, and the pressure. The partial oxidation of hydrocarbon-containing fuels is conventionally carried out at about 1000° to 1600°, in particular at 1200° to 1600° C., and at pressures of 1.0 to 15.0, in particular 2.0 to 10, preferably 3.0 to 5.0, MPa. The hydrogen contained in the synthesis gas results from the reaction of water which is fed to the partial oxidation in the liquid state and/or in the form of steam. The water required for the reaction can be introduced as a separate stream or as a mixture with other streams, for example mixed with the hydrocarbons, the oxygen or oxygen-containing gas stream. It is also possible to distribute the water, both in the liquid state and in the form of steam, among a plurality of streams. The same applies to the supply of the hydrocarbon-containing fuel and the oxygen or oxygen-containing gas. These reactants can also be fed to the reaction either separately or distributed among a plurality of streams.

As a consequence of the conditions prevailing in the partial oxidation, the burner is subjected to a considerable extent to a series of physical and chemical stresses. The high exit velocities of the mass streams, in particular the gas streams, produce vibrations which cause a high mechanical load on the burner. Moreover, the composition of the highly reactive gas mixture resulting from the partial oxidation, coupled with the high temperatures used, exposes the burner to a great extent to chemical attack. In addition, slag particles, which can be deposited in the molten state on the burner, lead to chemical reactions and erosion, thereby increasing the stress on the burner, especially near its downstream end.

In addition, the burner is exposed to thermal stress, caused by the high intensity of the thermal radiation occurring in the gasification. This thermal stress is higher in the gasification of fuels containing hydrocarbons than in the corresponding reaction of a coal/water suspension. The higher gasification temperature on the one hand, and the shorter distance between the burner and the gasification zone on the other, are responsible for this. The higher temperature is a consequence of the easier flammability of the hydrocarbon and the reduced distance results from an earlier ignition of the hydrocarbon, because of its lower ignition temperature compared to the coal/water suspension.

In continuous operation, the burner is subjected not only to vibrations and a chemical attack by the highly reactive synthesis gas, but is also subjected to erosion by slag particles and to large thermal stresses. Although high-grade materials, in particular high alloy special steels such as Incoloy and Hastelloy, are used for the part of the burner projecting into the gasification reactor, the burner has only a very limited life expectancy of only about three to four months. This is a considerable disadvantage for the operation of a modern plant for the production of synthesis gas, since the burner can only be changed when the plant is shut down. However, shutting down the synthesis gas plant requires the cooling and depressurizing of the apparatus; after the defective burner has been replaced, the plant must first be heated up again and repressurized before the production of synthesis gas can be resumed.

SUMMARY OF THE INVENTION

The object, therefore, is to produce a burner having considerably increased life expectancy. This object was achieved by a burner for the production of synthesis gas by partial oxidation of carbon-containing fuels, having three or more concentric tubes and which may taper conically toward the burner outlet. A cooling chamber, surrounding the burner outlet, is located adjacent the downstream end of the burner and the downstream face of the chamber is clad with a layer composed of individual, adjacently-arranged ceramic platelets.

DETAILED DESCRIPTION OF THE INVENTION

The burner according to the invention contains at least three, in particular three to six, preferably three to four, particularly preferably three concentric tubes. The conical tapers of the tubes form the outlet orifices for the individual mass streams, the innermost tube forming an outlet orifice and the remaining tubes forming corresponding annular outlet orifices.

The burner according to the invention is suitable for the partial oxidation of both coal/water suspensions and hydrocarbons or hydrocarbon-containing fuels. The burner has proven to be particularly valuable in the production of synthesis gas by partial oxidation of hydrocarbons or hydrocarbon-containing fuels.

The downstream face of the cooling chamber, which faces the gasification zone, is clad with individual ceramic platelets, which are arranged adjacent each other in a surface-covering manner, like a mosaic. The individual ceramic platelets are bonded both to each other and to the face of the chamber by a ceramic adhesive. The ceramic adhesive constitutes a layer on the face of the chamber and the individual ceramic platelets are embedded therein.

According to a particular embodiment, the individual ceramic platelets have one or more protrusions and the face of the chamber has recesses complementary thereto. By introducing the protrusions on the upstream side of the ceramic platelets into the recesses of matching shape, an additional bonding of ceramic platelets and the face of the cooling chamber is created and the mechanical strength is thereby increased. It has proven to be particularly expedient to design the protrusions and recesses in a dovetail shape, but other shapes such as pins or knobs are also suitable.

It is possible to distribute the ceramic platelets next to each other in any desired arrangement on the face of the chamber in a surface-covering manner. It is particularly expedient to arrange the individual ceramic platelets so that they form a ring; a plurality of such concentric rings covers the face of the chamber.

The ceramic platelets of the individual rings are expediently offset with respect to each other. By this means, the formation of long continuous joints, which could have disadvantageous effects on the mechanical stability of the cladding, is avoided. The individual ceramic platelets can have any desired shape. They can be round, square, rectangular, rhomboid, triangular, quadrangular, or have the shape of a regular or irregular polygon. Ceramic platelets of identical or different shape can be arranged adjacently. Ceramic platelets having the shape of a trapezoid or of a ring segment are particularly suitable. This shape facilitates the arrangement of the individual ceramic platelets to form a ring.

The individual ceramic platelets advantageously have a layer thickness of 1 to 10, in particular 2 to 5 mm, calculated in each case without the protrusion which serves to anchor the platelets to the face of the cooling chamber. The sides of the individual ceramic platelets should not be too long; a length of the individual sides up to 50 mm should be sufficient. In most cases, it is recommended that the length of each side of the ceramic platelets be 5 to 35, in particular 6 to 30, preferably 8 to 20 mm.

The individual ceramic platelets are composed of a ceramic resistant to the conditions occurring in the gasification reaction. Suitable materials are oxide ceramics, which contain, for example, $Al_2O_3$, $Cr_2O_3$, MgO, $ZrO_2$, and/or $SiO_2$; or non-oxide ceramics include carbides and nitrides of boron, aluminum, or silicon. Silicon nitride is particularly suitable.

The ceramic adhesive must also be resistant to the conditions occurring in the gasification reaction and a lasting, elastic bond between the individual platelets and the face of the cooling chamber must be ensured. A ceramic adhesive based on an aluminosilicate, which is matched to the thermal expansion behavior of the ceramic platelets, has proven to be particularly effective.

In the accompanying drawings, constituting a part hereof, and in which like reference characters indicate like parts, FIG. 1 is a schematic longitudinal section through the downstream end of the burner;

Figure 1:
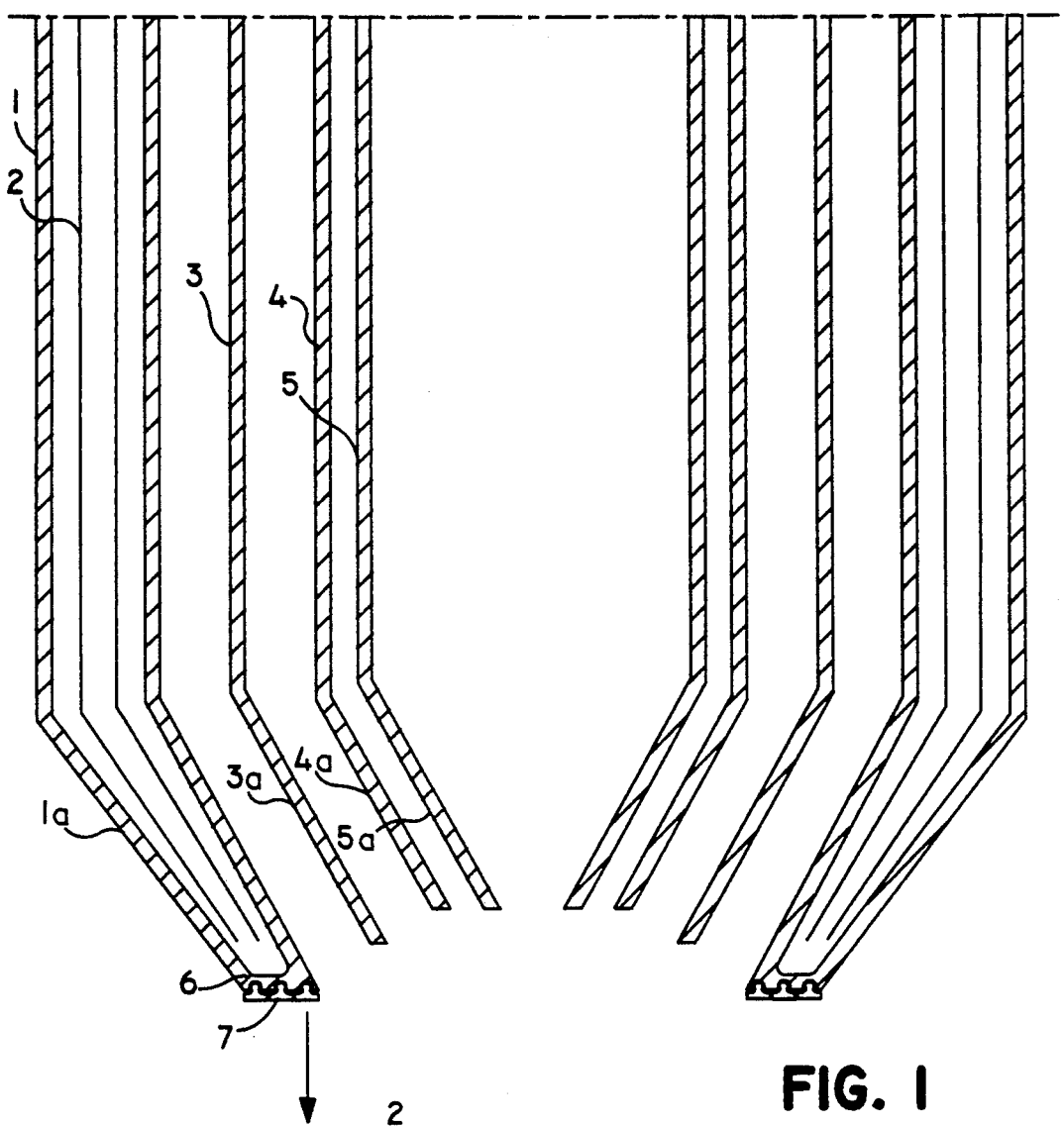
FIG. 1a is an enlarged fragmentary view, similar to that of FIG. 1, showing a detail of the downstream end of the cooling chamber.

Referring particularly to FIG. 1, the burner is composed of outer jacketed tube having conical taper 1a and containing inserted tube 2 for feeding a coolant, and a plurality of concentric inner tubes 3, 4, and 5 optionally having corresponding conical tapers 3a, 4a, and 5a. The individual mass streams pass through the intermediate spaces which are formed firstly by jacketed tube 1 and the inner tube 3, secondly by inner tube 3 and inner tube 4, and thirdly by inner tube 4. Optionally a tube may be inserted in the center of tube 4. The mass stream containing the oxygen or oxygen-containing gas is conducted through the space between tubes 1 and 3 and through tube 4, and the mass stream containing the carbon-containing material flows through the space between tube 3 and tube 4. If tube 5 is in tube 4, a further mass stream of carbon-containing material may be conducted through tube 5. The mass streams exit at the annular orifices formed by the conical tapers 1a, 3a, and 4a, and through conical taper 5a of tube 5.

Jacketed tube 1 is closed at the downstream end of its conical taper 1a. This closed part forms face 6 of the cooling chamber, which is clad with layer 7 composed of individual, adjacently arranged ceramic platelets 7a. The coolant, preferably water, is introduced through coolant tube 2 within jacketed tube 1. As a result, jacketed tube 1, particularly in the region of conical taper 1a, functions as the cooling chamber.

Figure 1A:
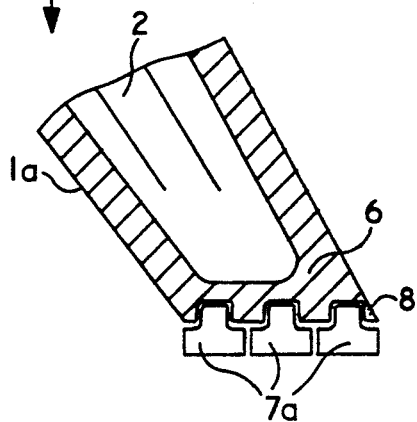

In FIG. 1a, conical taper 1a of jacketed tube 1, together with coolant tube 2 forms the cooling chamber, and face 6 is clad with ceramic platelets 7a which have dovetail-shaped projections. Ceramic platelets 7a are bonded both to each other and to face 6 by means of layer 8 of a ceramic adhesive.

Figure 2:
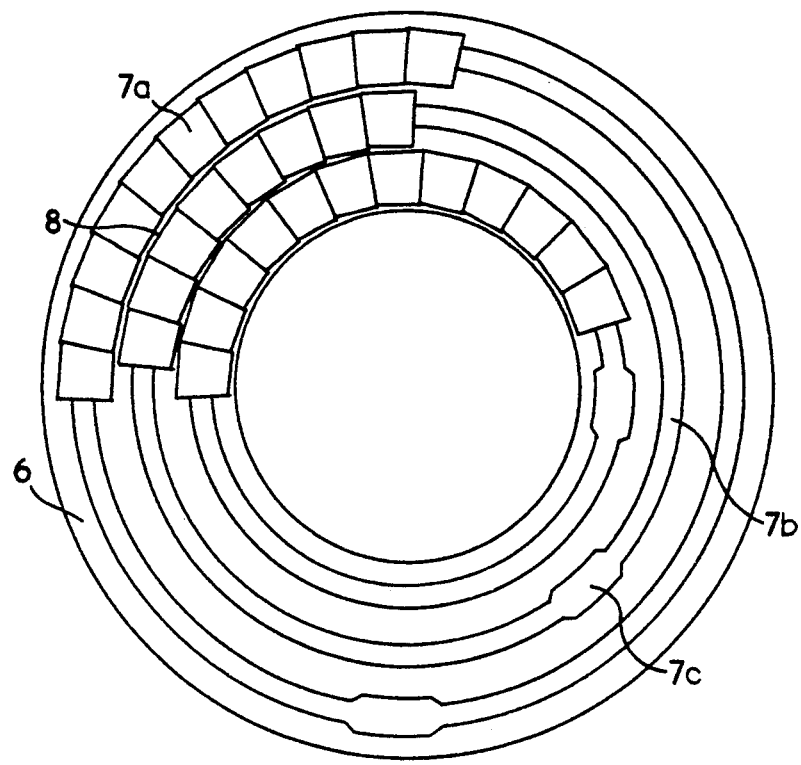
FIG. 2 is a schematic plan view of the downstream end of the burner, showing the ceramic platelets partially in place and omitting the inner tubes for clarity.

As shown in FIG. 2, face 6 is partially covered by ceramic platelets 7a. Face 6 has three dovetail-shaped annular grooves 7b to receive the complementary dovetail-shaped projections of ceramic platelets 7a. Each annular groove 7b has an expanded opening 7c, which permits insertion of the dovetail-shaped projections of ceramic platelets 7a. By inserting each ceramic platelet 7a into expanded opening 7c and sliding platelet 7a circumferentially, its dovetail-shaped projection is retained in annular groove 7b. By sequentially inserting the individual ceramic platelets, a corresponding ring is formed. The projection of ceramic platelet 7a introduced last is first inserted into expanded opening 7c, and the entire ring formed by the individual ceramic platelets is then offset by half the length of expanded opening 7c. By this means, it is ensured that the two ceramic platelets adjacent expanded opening 7c are located with their dovetail-shaped projections at least partly in annular groove 7b and do not fall out. Between the individual ceramic platelets, and between the platelets 7a and face 6, there is layer 8 of the ceramic adhesive.

Figure 2A:
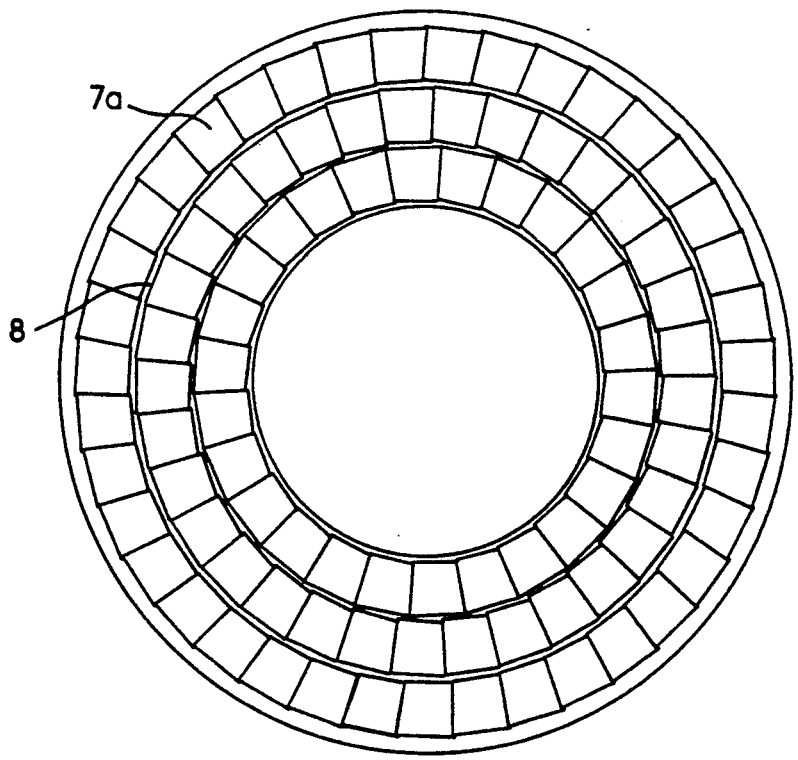
FIG. 2a is a view similar to FIG. 2 showing all the ceramic platelets in place.

In FIG. 2a, the completed rings are shown. Ceramic platelets 7a have faces which are trapezoidal and have been sequentially inserted so that three concentric annular surfaces result. The ceramic adhesive is located between platelets 7a and face 6, as well as between the individual ceramic platelets.

While only a limited number of specific embodiments of the present invention have been expressly disclosed, it is, nonetheless, to be broadly construed and not to be limited except by the character of the claims appended hereto.

What we claim is:

1. A burner for the production of synthesis gas by partial oxidation of carbon-containing fuels, said burner comprising at least three concentric tubes forming at least two annular passages and a central passage, each adapted to permit flow of fluids therethrough in a downstream direction, said concentric tubes constituting a burner outlet at their downstream ends,
   a cooling chamber surrounding and adjacent said burner outlet and having a downstream face at its downstream end, a layer of individual, adjacent ceramic platelets on said downstream face
   each ceramic platelet having an upstream side connected to said downstream face and a downstream surface exposed to ambient conditions.

2. The burner of claim 1 wherein said concentric tubes taper inwardly adjacent said burner outlet.
3. The burner of claim 1 wherein said ceramic platelets are bonded to said downstream face by a ceramic adhesive.
4. The burner of claim 3 wherein said ceramic adhesive comprises high temperature resistant aluminosilicate.
5. The burner of claim 1 wherein said ceramic platelets have projections on their upstream sides and said downstream face has corresponding recesses complementary thereto.
6. The burner of claim 5 wherein said corresponding recesses are a circumferential ring and said projections are dovetails.
7. The burner of claim 5 wherein said corresponding recesses are a circumferential ring, said ring having at least one generally radially expanded portion which is wider than other portions of said ring, whereby said projections can be inserted therein.
8. The burner of claim 7 wherein each said expanded portion has a circumferential length at least as long as a corresponding circumferential length of one of said projections and less than a corresponding circumferential length of two of said projections.
9. The burner of claim 1 wherein said ceramic platelets are adjacent one another and form a ring.
10. The burner of claim 9 wherein a plurality of adjacent rings of platelets are formed with platelets in adjacent rings being offset from each other.
11. The burner of claim 1 wherein each said downstream surface is a trapezoid.
12. The burner of claim 1 wherein each said downstream surface is a ring segment.
13. The burner of claim 1 wherein each said ceramic platelet has a thickness of 1 to 10 mm.
14. The burner of claim 13 wherein said thickness is 2 to 5 mm.
15. The burner of claim 1 wherein said ceramic platelets have a side length of 5 to 35 mm.
16. The burner of claim 15 wherein said side length is 6 to 30 mm.
17. The burner of claim 16 wherein said side length is 8 to 20 mm.
18. The burner of claim 1 wherein each of said ceramic platelets are composed of at least one ceramic selected from the group consisting of $Al_2O_3$, $Cr_2O_3$, MgO, $ZrO_2$, $SiO_2$, carbides of boron, aluminum, and silicon, and nitrides of boron, aluminum, and silicon.
19. The burner of claim 18 wherein each said platelet is composed of silicon nitride.
20. The burner of claim 1 wherein said ceramic platelets are bonded to each other by a ceramic adhesive.

* * * * *